(12) United States Patent
Olster (10) Patent No.: US 8,010,835 B2
(45) Date of Patent: Aug. 30, 2011

(54) STORAGE DEVICE REALIGNMENT

(75) Inventor: Dan Olster, Woodlands Hills, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 209 days.

(21) Appl. No.: 12/268,983

(22) Filed: Nov. 11, 2008

(65) Prior Publication Data

US 2010/0122115 A1  May 13, 2010

(51) Int. Cl.
*G06F 11/00* (2006.01)
(52) U.S. Cl. .......................... 714/6.2; 714/6.21
(58) Field of Classification Search .................. 714/7
See application file for complete search history.

(56) References Cited

U.S. PATENT DOCUMENTS

| | | | |
|---|---|---|---|
| 6,804,794 B1* | 10/2004 | Robidoux et al. ............... 714/5 |
| 6,990,611 B2* | 1/2006 | Busser ............................ 714/42 |
| 7,689,858 B2* | 3/2010 | Koarashi ......................... 714/5 |
| 7,774,643 B2* | 8/2010 | Wang .............................. 714/8 |
| 2002/0095616 A1* | 7/2002 | Busser ............................ 714/8 |
| 2004/0153728 A1* | 8/2004 | Suzuki et al. ................... 714/6 |
| 2005/0050401 A1* | 3/2005 | Matsuki et al. ................ 714/42 |
| 2005/0166084 A1* | 7/2005 | Yagisawa et al. ............... 714/6 |
| 2006/0015767 A1* | 1/2006 | Sun Hsu et al. ................. 714/5 |
| 2007/0079170 A1* | 4/2007 | Zimmer et al. ................. 714/6 |
| 2007/0159897 A1* | 7/2007 | Wang ............................ 365/200 |
| 2007/0174662 A1* | 7/2007 | Zelikov et al. .................. 714/5 |
| 2008/0005614 A1* | 1/2008 | Lubbers et al. ............... 714/11 |
| 2008/0126847 A1* | 5/2008 | Koarashi ......................... 714/6 |
| 2008/0178041 A1* | 7/2008 | Takahashi et al. .............. 714/6 |
| 2008/0313497 A1* | 12/2008 | Hirakawa et al. ............. 714/15 |
| 2009/0006890 A1* | 1/2009 | Takada et al. ................... 714/9 |
| 2009/0077416 A1* | 3/2009 | D'Souza et al. ................ 714/6 |
| 2009/0228648 A1* | 9/2009 | Wack ........................... 711/114 |
| 2009/0259882 A1* | 10/2009 | Shellhamer ..................... 714/7 |
| 2010/0050012 A1* | 2/2010 | Nonaka et al. .................. 714/5 |
| 2010/0077252 A1* | 3/2010 | Siewert et al. .................. 714/6 |
| 2010/0107003 A1* | 4/2010 | Kawaguchi ..................... 714/6 |

* cited by examiner

*Primary Examiner* — Scott Baderman
*Assistant Examiner* — Kamini Patel
(74) *Attorney, Agent, or Firm* — SoCal IP Law Group LLP; Mark A. Goldstein (57) ABSTRACT

Realigning storage devices arranged as storage arrays when one of the storage arrays enters a critical state after failure of a storage device is disclosed. The method is particularly useful for RAID groups of storage devices. The method may be used with hard disk drives, solid-state drives, and other storage devices arranged as groups. The method includes identifying when a storage array of a plurality of storage arrays is in a critical condition. A critical condition storage array and a healthy storage array are identified. Both the critical condition storage array and the healthy storage array are rebuilt. The rebuilding includes configuring the critical condition storage array to include a storage device from the healthy storage array and configuring the healthy storage array to function with one less storage device. The method may be implemented in hardware, firmware, software, or a combination thereof.

27 Claims, 5 Drawing Sheets

FIG. 5

STORAGE DEVICE REALIGNMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to storage devices such as hard disk drives and hard disks configured in arrays such as a Redundant Arrays of Inexpensive Disks (RAID).

2. Description of the Related Art

Hard disk drives (HDDs) are ubiquitous in our society, included with or coupled to computers, configured as groups and coupled with servers, included in portable media players, and even included in automobile navigation systems. However reliable they are, hard drives and other storage devices occasionally fail. To increase the reliability, capacity, and performance of a hard disk, multiple hard disks may be used as a group. A popular configuration of a group of hard disks is known as RAID, an acronym for Redundant Arrays of Inexpensive (or Independent) Disks. The fundamental principle behind RAID is that it allows a collection of individual disks to behave as one larger, faster, and more reliable disk. And as solid-state flash memory storage devices become more widespread, RAID techniques are being used with storage devices other than hard disks, including, for example, solid-state drives (SSD) that conform to hard disk drive standards.

DETAILED DESCRIPTION

Environment

Figure 1:
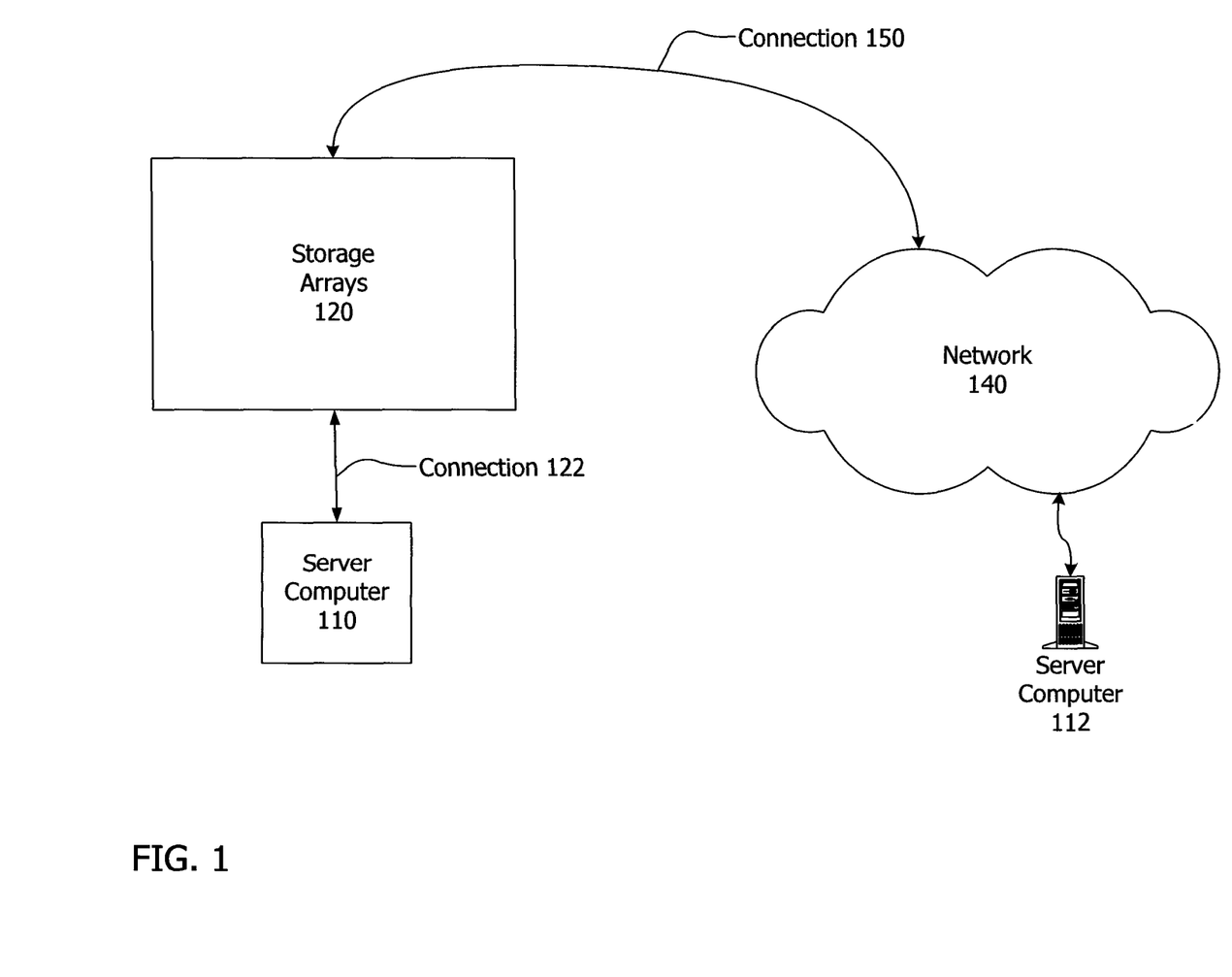
FIG. 1 is a block diagram of an environment in which storage device realignment may be performed.

FIG. 1 is a block diagram of an environment in which storage device realignment may be performed. Servers such as server computers 110 and 112 may provide access to data stored on a group of storage arrays 120. The servers may manage or otherwise control the storage devices included in the group of storage arrays 120. The servers may be directly coupled to one or more groups of storage arrays 120 over connection 122 or may be coupled over a network 140 to one or more groups of storage arrays 120 over connection 150.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated network, and may be a combination of these. Connections 122 and 150 may be wire lines, optical fiber cables, wireless communication connections, and others, and may be a combination of these.

Figure 2:
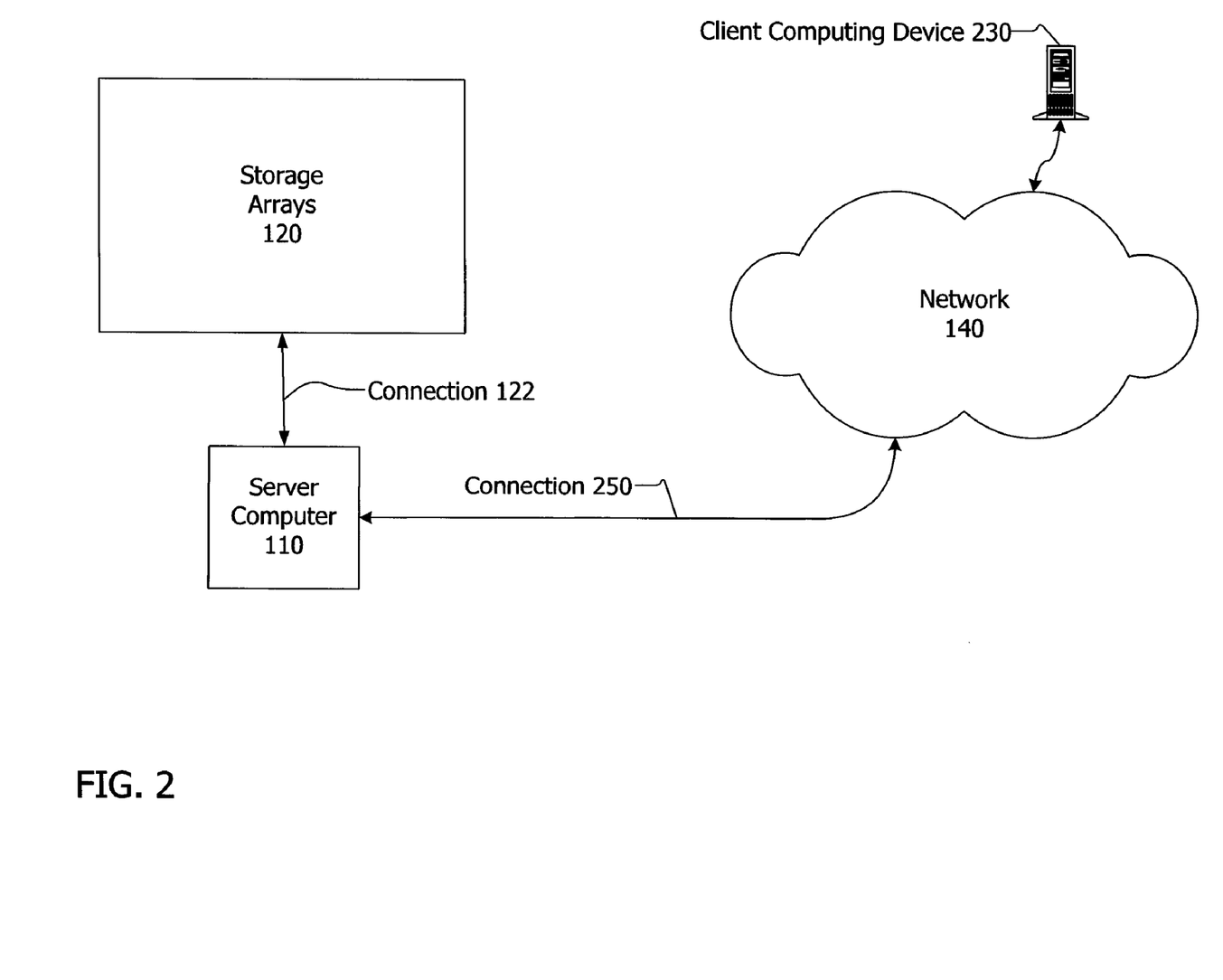
FIG. 2 is a block diagram of a second environment in which storage device realignment may be performed.

FIG. 2 is a block diagram of a second environment in which storage device realignment may be performed. Typically one more computing devices request data from a server. This may be in any of many scenarios, such as, requesting mail from a mail server, requesting data from a database server or running a database query, performing a banking transaction, viewing a photo album online, or requesting music from a music server or store. There are myriad examples. In all of these examples, a user on a client computer such as client computing device 230 makes a request for data over network 140 via connection 250 from a server such as server computing device 110 which is coupled with storage arrays 120 over connection 122.

The server computers 110 and 112 may be a specialized or general purpose computing devices. The server maybe any computing device that operates as a server. The server may be a specialized server, such as an application server, a video server, a graphics server, an advertisement server, a database server, or other server.

The functionality and features of the storage device realignment techniques described herein may be implemented in a controller (not shown) included internally in or externally coupled with a group of storage arrays, and may be implemented in a computing device such as a server computer 110 that is coupled with the group of storage arrays 120. A controller or server may implement the methods described herein on a single group of storage arrays or may implement the storage device realignment technique on multiple groups of storage arrays. A controller or server may manage or otherwise control the hard disk drives or other storage devices included in each of the storage arrays included in the group of storage arrays 120.

The functionality and features of the storage device realignment systems and methods described herein may be implemented in a controller or server computer as software, hardware, or firmware, or a combination of two or more of software, hardware and firmware. A controller or server computer may include one or more of logic arrays, memories, analog circuits, digital circuits, software, firmware, and processors such as microprocessors, a field programmable gate arrays (FPGAs), application specific integrated circuits (ASICs), programmable logic device (PLDs) and programmable logic array (PLAs). The hardware and firmware components of the server computers 110 and 112 or controller may include various specialized units, circuits, software and interfaces for providing the functionality and features described herein. The processes, functionality and features may be embodied in whole or in part in software which operates on a controller or server computer and may be in the form of one or more of firmware, an application program, object code, machine code, an executable file, an applet, a COM object, a dynamic linked library (DLL), a script, one or more subroutines, or an operating system component or service, and other forms of software. The hardware and software and their functions may be distributed such that some components are performed by a controller or server, and others by other controllers or servers.

Although a server computer 110 is shown, the processes may be implemented with any computing device. Similarly, the client computing device 230 may be any network capable computing device.

A computing device as used herein refers to any device with a processor, memory and a storage device that may execute instructions such as software including, but not limited to, personal computers, server computers, computing tablets, set top boxes, video game systems, personal video recorders, telephones, personal digital assistants (PDAs), portable computers, and laptop computers. These computing devices may run an operating system, including, for example, versions of the Linux, Unix, MS-DOS, Microsoft Windows, Palm OS, Solaris, Symbian, and Apple Mac OS X operating systems. Computing devices may include a network interface in the form of a card, chip or chip set that allows for communication over a wired and/or wireless network. The network interface may allow for communications according to various protocols and standards, including, for example, versions of Ethernet, Infiniband® network, Fibre Channel, and others. A computing device with a network interface is network capable.

Figure 3:
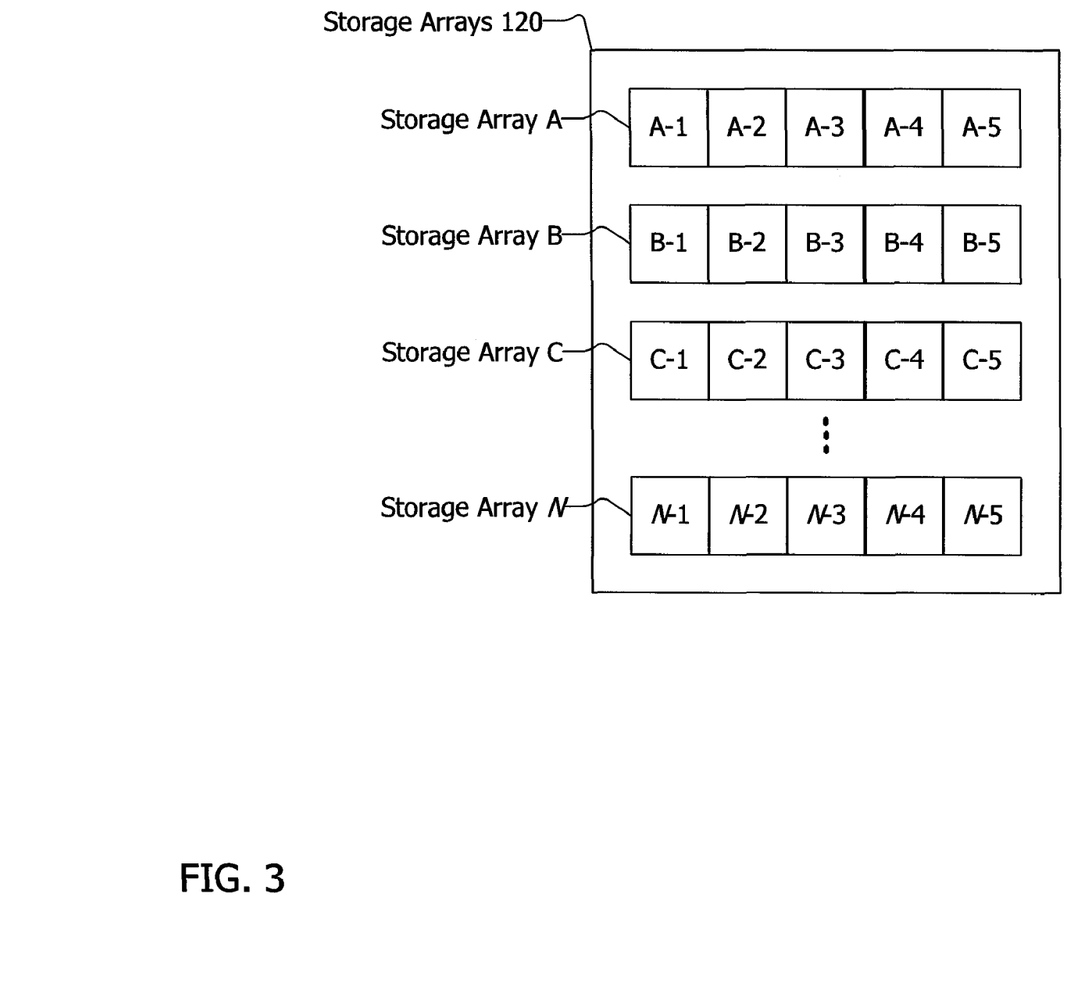
FIG. 3 is a block diagram of an example group of storage arrays.

Referring now to FIG. 3, a block diagram of an example group of storage arrays 120 is shown. The group of storage arrays 120 may include many storage arrays. As shown, the group of storage arrays 120 includes storage arrays, A, B, C through N, where N is a number such as 12, 16, 24, 32, 48, 64, 128, etc. Each of the storage arrays in the example storage array 120 may conform to RAID 6 and have five hard disk drives. Namely, storage array A includes five storage devices, A-1 through A-5. The storage arrays may conform to other RAID standards or to perform according to other ways of providing redundant reliable storage groups. The storage arrays may have more than five storage devices or less than five storage devices.

Each of the storage arrays of the group of storage arrays 120 may include or be coupled with a controller. The group of storage arrays 120 may include or be coupled with a controller. The group of storage arrays 120 may include a network interface and/or a communications interface as defined herein. The group of storage arrays 120 may be included in a single rack or cabinet, and the rack or cabinet may include a controller, and the controller or the rack may include a network interface. Each of the storage arrays in the group of storage arrays includes a group of storage devices. The storage devices in each of the storage arrays may be connected through a backplane or bus. Each of the storage arrays included in the group of storage arrays 120 may be connected through a backplane or bus. The group of storage arrays 120 may be a networked attached storage (NAS) device or be part of a SAN.

To provide data reliably to the requesting servers and/or client computing devices, data may be stored as Redundant Arrays of Inexpensive (or Independent) Disks. There are various configurations of RAID storage, including RAID 0, RAID 1, RAID 10, RAID 0+1, RAID 1+0, RAID 2, RAID 3, RAID 4, RAID 5, RAID 5+1, RAID 5+0, RAID 53, X-RAID®, G-RAID®, EZRAID®, SYNCRAID® systems, and others. Hard disk drives may also be arranged according to other techniques as a group of disks that have a backup or redundancy feature. The term "storage array" is used herein to refer to any configuration of two or more hard disk drives, solid-states drives, or other storage devices having backup and/or redundancy features, including the various configurations of RAID storage.

Each of the storage arrays included in storage array 120 typically includes multiple storage devices, such as, for example, hard disk drives. The storage devices included in a storage array may be of the same capacity, may have the same physical size, and may conform to the same specification, such as, for example, a hard disk drive specification. Example sizes of storage devices include, but are not limited to, 2.5" and 3.5". Example hard disk drive capacities include, but are not limited to, 250 Mbytes, 500 Mbytes, and 1 terabyte. Example hard disk drive specifications include Serial Attached Small Computer System Interface (SAS), Serial Advanced Technology Attachment (SATA), and others. An example storage array may include six 3.5" hard disk drives having a capacity of 1 terabyte each and conforming to the SATA standard. In some embodiments, the physical size of the hard disk drives in a storage array may differ, and/or the hard disk drive specification of the hard disk drives in a storage array may not be uniform among all of the hard disk drives in an array.

The storage devices in a storage array may, but need not, be included in a single cabinet, rack or blade. When the storage devices in a storage array are included in a single cabinet, rack or blade, they may be coupled with a backplane. A controller may be included in the cabinet, rack or blade with the storage devices. The backplane may be coupled with or include the controller. The controller may communicate with and allow for communications with the storage devices according to the hard disk drive specification. The controller may include a processor, volatile memory and non-volatile memory. The controller may be a single computer chip such as an FPGA, ASIC, PLD and PLA. The controller may include or be coupled with a network interface.

In another embodiment, the group of storage arrays may be included in a single cabinet or rack. When the group of storage arrays are included in a single cabinet or rack, they may be coupled with a backplane. A controller may be included in the cabinet with the storage arrays. The backplane may be coupled with the controller. The controller may communicate with and allow for communications with the storage arrays. The controller may include a processor, volatile memory and non-volatile memory. The controller may be a single computer chip such as an FPGA, ASIC, PLD and PLA.

The rack or cabinet containing the group of storage arrays 120 may include a communications interface that allows for connection to a computing device. The communications interface may allow for the transmission of and receipt of information according to one or more of a variety of standards, including, but not limited to, universal serial bus (USB), IEEE 1394 (also known as Firewire® and i.link®), WiFi (also known as IEEE 802.11), and others. The rack or cabinet containing the group of storage arrays 120 may alternatively or additionally include a network interface ship, card or device that allows for communication over a wired and/or wireless network. The controller included in or coupled the rack or cabinet containing the storage array may alternatively or additionally include a network interface chip, card or device that allows for communication over a wired and/or wireless network.

The techniques discussed herein are described with regard to storage devices including, but not limited to, hard disk drives and solid-state drives. The techniques may be implemented with other readable and writable storage devices arranged as groups.

As used herein, a storage device is a device that allows for reading from and/or writing to a storage medium. Storage devices include hard disk drives (HDDs), solid-state drives (SSDs), DVD drives, flash memory devices, and others. Storage media include magnetic media such as hard disks, flash memory, and optical disks such as CDs and DVDs.

The term data as used herein includes a bit, byte, word, block, stripe or other unit of information.

The storage array 120 may stripe data among all of the hard disk drives in logical units. The storage arrays described herein include storage devices that store data as logical units or LUNs. A LUN includes multiple bits, bytes, words, blocks and stripes. The size of a LUN may be user configurable, system configurable, or system defined, and may be static or variable, depending on the embodiment of the storage array. LUN size may be measured in, for example, bytes, megabytes, gigabytes, terabytes and blocks. In some embodiments, LUNs may be a few gigabytes in size or a few terabytes in size. Each LUN may be defined by the number of blocks it contains. Example LUN sizes include 128 blocks, 256 blocks, 1024 blocks, and others. Example block sizes include 512 bytes, 1024 bytes, 2048 bytes, 4096 bytes, and others.

Referring again to FIG. 3, each of the storage device arrays A, B, C, through N include multiple storage devices. In this example, the storage arrays each include five storage devices, for example, storage array A includes storage devices A-1 through A-5. Depending on the storage strategy used in the storage arrays, data as well as information used to recreate a failed drive may be stored across the five drives according to a striped paradigm. Referring to FIG. 3, the RAID system may stripe data across the five drives included in each storage array such that various LUNs in each storage array contain data while other LUNs contain parity information for the data. The RAID techniques and striping methodology are well known in the hard disk storage field and are not described herein.

Description of Processes

Figure 4:
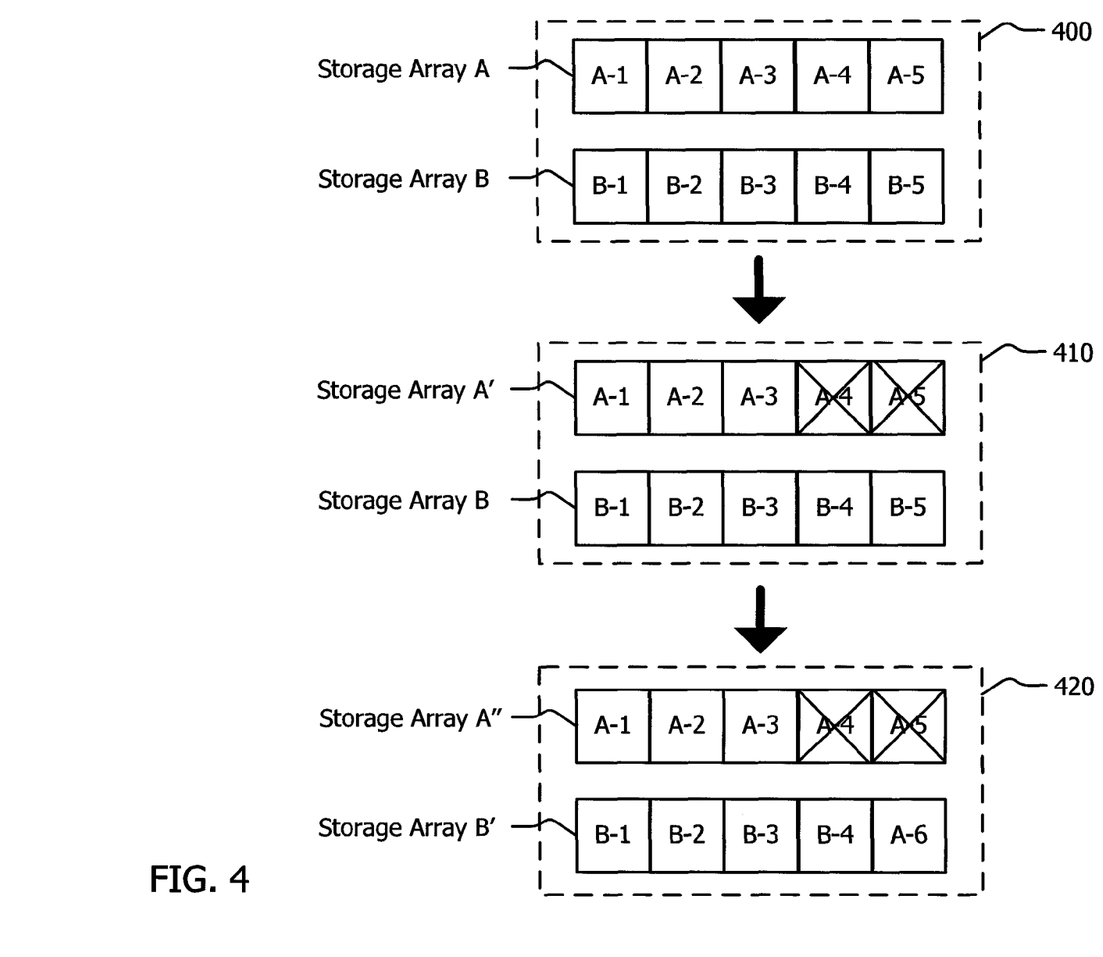
FIG. 4 is a block diagram of example storage arrays at various times during the realignment process.

FIG. 4 is a block diagram of example storage arrays at various times during the realignment process. Blocks 400, 410 and 420 show two example storage arrays from a storage array group such as storage arrays 120 shown in FIG. 3. The blocks 400, 410 and 420 show two storage arrays at each of three different moments in time, with block 410 being later in time than block 400, and block 420 being later in time than block 410.

Block 400 shows storage arrays A and B functioning normally. Should a single storage device in a storage array go down, have errors or otherwise cease functioning, because of the RAID configuration of the storage array, the storage array would be able to continue to function, but with less redundancy and more chance of a catastrophic failure that could result in lost data. Block 410 shows storage arrays A' and B, with storage array A' having two hard disks down, as shown by the X through A-4 and A-5. With two of the storage devices in storage array A' down, storage array A' is considered to be in a critical condition, as a catastrophic failure that results in lost data is possible. A storage array is considered to be in a critical condition is when the failure of another constituent storage device will result in data loss or will cause the storage array to become inaccessible. In one embodiment, a critical condition occurs when two out of the five hard disk drives in a RAID 6 storage array have failed.

Traditionally, to remedy the critical condition situation of storage array A', an information technology specialist would be required. The information technology specialist would swap out or replace the bad or failed hard disk drives A-4 and A-5 with fresh, healthy or new replacement or backup hard disk drives.

However, if there are no replacement or backup hard disk drives and/or if a technology specialist is not available, storage array A' shown in Block 410 would remain in a critical state. And even if a technology specialist with a replacement or backup hard disk drive is available, there would be a delay of some amount of time for the technology specialist to take action.

According to the systems and methods described herein, to remedy the critical condition situation of storage array A', a healthy storage array of a group of storage arrays having no failed devices is located. In this example, storage array B shown in Blocks 400 and 410 has no failed devices and is a healthy storage array. A storage array is considered to be healthy when all of its constituent storage devices are functioning normally. A storage array may be considered healthy when it is performing in conformance with operating specifications. Although storage array B is shown located next to or adjacent to storage array A, the located healthy storage array need not be immediately adjacent to or physically close to the critical condition storage array. In one embodiment, it is preferable that the healthy storage array and the critical condition storage array are in the same rack or group of storage arrays. In another embodiment, a healthy storage array having the fastest communication connection through the controller or server implementing the method is selected. In this way, the time to realign the critical condition storage array will be shorter and the recovery of the critical condition storage array will occur faster.

The critical condition storage array and the healthy located storage array are both then reconfigured to achieve realignment of the storage devices therein. The reconfiguration makes the critical condition storage array and the healthy storage array both operate in a degraded mode. A storage array is in degraded mode when it operates will less than all of its constituent storage devices, but is not in a critical condition. In one embodiment, a storage array that include five hard disk drives and conforms to the RAID 6 standard is in a degraded mode when one of the five hard disk drives in the storage array has failed or has crashed. The result of the realignment is that the chances of data loss resulting from a catastrophic failure of a storage array are reduced.

As shown in block 410 of FIG. 4, healthy storage array B and critical condition storage array A' are both rebuilt so that they are both in a degraded condition as shown in block 420. Specifically, a storage device from storage array B is allocated to storage device A, changing the example storage device from B-5 to A-6. This can be seen by comparing the storage arrays shown in blocks 410 and 420. In this example, the storage array A" is configured to access a storage device from storage array B as if it were in storage array A. The result is degraded storage arrays A" and B' shown in block 420. In this way, both storage arrays A" and B' operate in a degraded mode shown in block 420 while eliminating the possible catastrophic failure of storage array A' shown in block 410.

Figure 5:
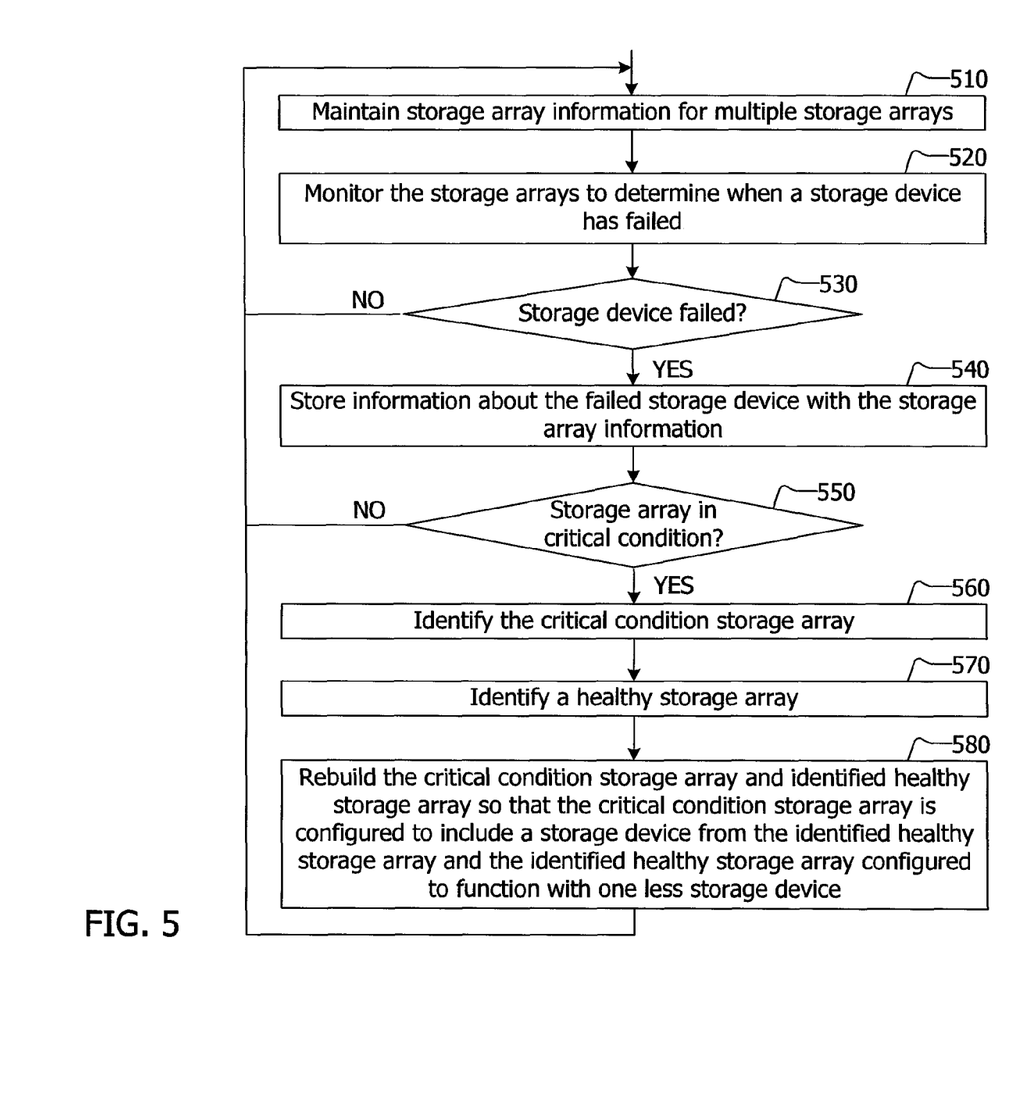
FIG. 5 is a flow chart of the actions taken to achieve storage device realignment.

FIG. 5 is a flow chart of the actions taken to achieve storage device realignment. As described herein, the method may be performed by a controller included in or coupled with a rack or group of storage arrays or may be performed by a computing device such as a server computer coupled with one or more racks or other group or groups of storage arrays.

Whenever data is written to, read from or deleted from the storage arrays, information about the health of the storage arrays is maintained, as shown in block 510. The stored and maintained storage array information may include the uptime; temperature at various times; number of bad blocks, LUNs or other portions of the storage devices at various times; and/or the number of writes, reads and other accesses to the storage arrays and/or storage devices included in the storage arrays. The storage array information may be stored in a table or other data structure. The table or other data structure used to store the storage array information may be maintained in a nonvolatile storage device such as an electronically erasable programmable read-only memory (EEPROM) or flash memory, or other storage medium, volatile or nonvolatile, included in the storage array or a controller coupled with or included in the storage array or included with or coupled with a server that is coupled with the storage arrays. The table or other data structure used to store storage array information may be updated whenever data is written to, read from or deleted from a storage array and/or when the condition of a storage device changes, such as when a storage device fails or is near failure.

The storage arrays and the storage devices included therein are monitored to detect a failure of a storage device, as shown in block 520. When the failure of a hard disk or other storage device in a storage array is detected, as shown in block 530, this fact is stored with the storage array information, as shown in block 540. When a hard disk or other storage device in a storage array has not failed, as shown in block 530, the flow of actions continues at block 510. A storage device is considered to have failed when it responds with an error code or is unresponsive. A failure may be indicated by irrecoverable read/write errors, complete lack of response to read or write requests, or other error responses from the storage device indicating irrecoverable failure. In some embodiments, a complete or irrecoverable failure may not be needed to consider a storage device to have failed. In one embodiment, a storage device is considered to have failed when there are a greater than a system defined number of bad blocks, bad sectors or bad LUNs. The system defined number may be set by storage array managing software, in a storage array controller such as, for example, a RAID controller, and may be user configurable. When a storage device fails, the identity of the storage device, the time of failure, the reason for failure, and/or other pertinent information may be stored with the storage array information.

A check is made to determine whether a storage array is in a critical condition, as shown in block 550. A storage array is considered to be in a critical condition is when the failure of another constituent storage device will result in data loss or will cause the storage array to become inaccessible. In one embodiment, a critical condition occurs when two out of the five hard disk drives in a RAID 6 array have failed. When there are no storage arrays in a critical condition, as shown in block 550, the flow of actions proceeds with block 510.

When it is determined that a storage array is in a critical condition, as shown in block 550, the critical condition storage array is identified, as shown in block 560. A healthy storage array is then identified, as shown in block 570. A storage array is considered to be healthy when all of its constituent storage devices are functioning normally. A storage array may be considered healthy when it is performing in conformance with operating specifications. The critical condition storage array and the identified healthy storage array are rebuilt so that the critical condition storage array is configured to include a storage device from the identified healthy storage array, and the identified healthy storage array is configured to function with one less storage device, as shown in block 580. In this way, the identified healthy storage array "donates" a storage device to the critical condition storage array. This is shown by reference to storage arrays A' and B in block 410 of FIG. 4 which are realigned and reconfigured as storage arrays A" and B' in block 420 of FIG. 4. The results is that the healthy storage array and the critical condition storage array both operate in a degraded mode. A storage array is in degraded mode when it operates will less than all of its constituent storage devices, but is not in a critical condition.

The rebuilding may be performed by reconfiguring data from the identified healthy storage array so that it is in a usable state with one less storage device. In one embodiment, the identified healthy storage array of five storage devices is reconfigured to run with four storage devices. The critical condition storage array is then reconfigured by reconfiguring data from the good or healthy storage devices of the critical condition storage array as well as one storage device from the identified healthy storage array. The techniques used in rebuilding the storage arrays are well known in the hard disk storage field, and, in particular, in the RAID field.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

What is claimed:

1. A method for realigning storage arrays comprising:
   maintaining storage array information for a plurality of storage arrays, including information about a plurality of storage devices included in the plurality of storage arrays
   monitoring the plurality of storage arrays to determine whether a storage device in one of the plurality of storage arrays has failed
   updating the storage array information when one of the storage devices in one of the plurality of storage arrays has failed
   identifying when a first storage array of the plurality of storage arrays is in a critical condition
   when the first storage array of the plurality of storage arrays is in a critical condition,
      identifying a critical condition storage array
      identifying a healthy storage array
      rebuilding both the critical condition storage array and the healthy storage array including
         configuring the critical condition storage array to include a storage device from the identified healthy storage array
         configuring the identified healthy storage array to function with one less storage device
      updating the storage array information based on the rebuilding.

2. The method of claim 1 wherein identifying when a first storage array of the plurality of storage arrays is in a critical condition comprises:
    determining that the first storage array will lose data or become in accessible should another storage device included in the first storage array fail.

3. The method of claim 1 wherein identifying a healthy storage array comprises:
    locating a second storage array of the plurality of storage arrays having all constituent storage devices functioning normally.

4. The method of claim 1 wherein the plurality of storage arrays are each configured as a Redundant Array of Inexpensive Disks (RAID).

5. The method of claim 1 wherein the plurality of storage arrays are each a Redundant Array of Inexpensive Disks (RAID) that include hard disk drives.

6. The method of claim 1 wherein the plurality of storage arrays are each a Redundant Array of Inexpensive Disks (RAID) that include solid-state drives.

7. The method of claim 1 wherein the critical condition storage array is one of the plurality of storage arrays that has at least one failed storage device and will become inaccessible should another storage device of the critical condition storage array fail.

8. The method of claim 1 wherein monitoring the plurality of storage arrays to determine whether a storage device in one of the plurality of storage arrays has failed includes:
    evaluating whether a storage device has more than a system defined number of bad blocks, bad sectors or bad logical units.

9. The method of claim 1 wherein the rebuilding results in the healthy storage array and the critical condition storage array operating in a degraded mode.

10. A storage medium having instructions stored thereon which when executed by a processor cause the processor to perform actions comprising:
    maintaining storage array information for a plurality of storage arrays, including information about a plurality of storage devices included in the plurality of storage arrays
    monitoring the plurality of storage arrays to determine whether a storage device in one of the plurality of storage arrays has failed
    updating the storage array information when one of the storage devices in one of the plurality of storage arrays has failed
    identifying when a first storage array of the plurality of storage arrays is in a critical condition
    when the first storage array of the plurality of storage arrays is in a critical condition,
        identifying a critical condition storage array
        identifying a healthy storage array
        rebuilding both the critical condition storage array and the healthy storage array including
            configuring the critical condition storage array to include a storage device from the identified healthy storage array
            configuring the identified healthy storage array to function with one less storage device
        updating the storage array information based on the rebuilding.

11. The storage medium of claim 10 wherein identifying when a first storage array of the plurality of storage arrays is in a critical condition comprises:
    determining that the first storage array will lose data or become in accessible should another storage device included in the first storage array fail.

12. The storage medium of claim 10 wherein identifying a healthy storage array comprises:
    locating a second storage array of the plurality of storage arrays having all constituent storage devices functioning normally.

13. The storage medium of claim 10 wherein the plurality of storage arrays are each configured as a Redundant Array of Inexpensive Disks (RAID).

14. The storage medium of claim 10 wherein the plurality of storage arrays are each a Redundant Array of Inexpensive Disks (RAID) that include hard disk drives.

15. The storage medium of claim 10 wherein the plurality of storage arrays are each a Redundant Array of Inexpensive Disks (RAID) that include solid-state drives.

16. The storage medium of claim 10 wherein the critical condition storage array is one of the plurality of storage arrays that has at least one failed storage device and will become inaccessible should another storage device of the critical condition storage array fail.

17. The storage medium of claim 10 wherein monitoring the plurality of storage arrays to determine whether a storage device in one of the plurality of storage arrays has failed includes:
    evaluating whether a storage device has more than a system defined number of bad blocks, bad sectors or bad logical units.

18. The storage medium of claim 10 wherein the rebuilding results in the healthy storage array and the critical condition storage array operating in a degraded mode.

19. A computing device to manage a plurality of storage arrays of storage devices, the computing device comprising:
    a processor;
    a memory coupled with the processor;
    a storage medium having instructions stored thereon which when executed cause the computing device to perform actions comprising:
        maintaining storage array information for a plurality of storage arrays, including information about a plurality of storage devices included in the plurality of storage arrays
        monitoring the plurality of storage arrays to determine whether a storage device in one of the plurality of storage arrays has failed
        updating the storage array information when one of the storage devices in one of the plurality of storage arrays has failed
        identifying when a first storage array of the plurality of storage arrays is in a critical condition
        when the first storage array of the plurality of storage arrays is in a critical condition,
            identifying a critical condition storage array
            identifying a healthy storage array
            rebuilding both the critical condition storage array and the healthy storage array including
                configuring the critical condition storage array to include a storage device from the identified healthy storage array
                configuring the identified healthy storage array to function with one less storage device
            updating the storage array information based on the rebuilding.

20. The computing device of claim 19 wherein identifying when a first storage array of the plurality of storage arrays is in a critical condition comprises:

determining that the first storage array will lose data or become in accessible should another storage device included in the first storage array fail.

21. The computing device of claim 19 wherein identifying a healthy storage array comprises:
  locating a second storage array of the plurality of storage arrays having all constituent storage devices functioning normally.

22. The computing device of claim 19 wherein the plurality of storage arrays are each configured as a Redundant Array of Inexpensive Disks (RAID).

23. The computing device of claim 19 wherein the plurality of storage arrays are each a Redundant Array of Inexpensive Disks (RAID) that include hard disk drives.

24. The computing device of claim 19 wherein the plurality of storage arrays are each a Redundant Array of Inexpensive Disks (RAID) that include solid-state drives.

25. The computing device of claim 19 wherein the critical condition storage array is one of the plurality of storage arrays that has at least one failed storage device and will become inaccessible should another storage device of the critical condition storage array fail.

26. The computing device of claim 19 wherein monitoring the plurality of storage arrays to determine whether a storage device in one of the plurality of storage arrays has failed includes:
  evaluating whether a storage device has more than a system defined number of bad blocks, bad sectors or bad logical units.

27. The computing device of claim 19 wherein the rebuilding results in the healthy storage array and the critical condition storage array operating in a degraded mode.

* * * * *